A. G. NEVILLE.
STEERING WHEEL FOR AUTOMOBILES.
APPLICATION FILED DEC. 31, 1913.
1,168,958.
Patented Jan. 18, 1916.
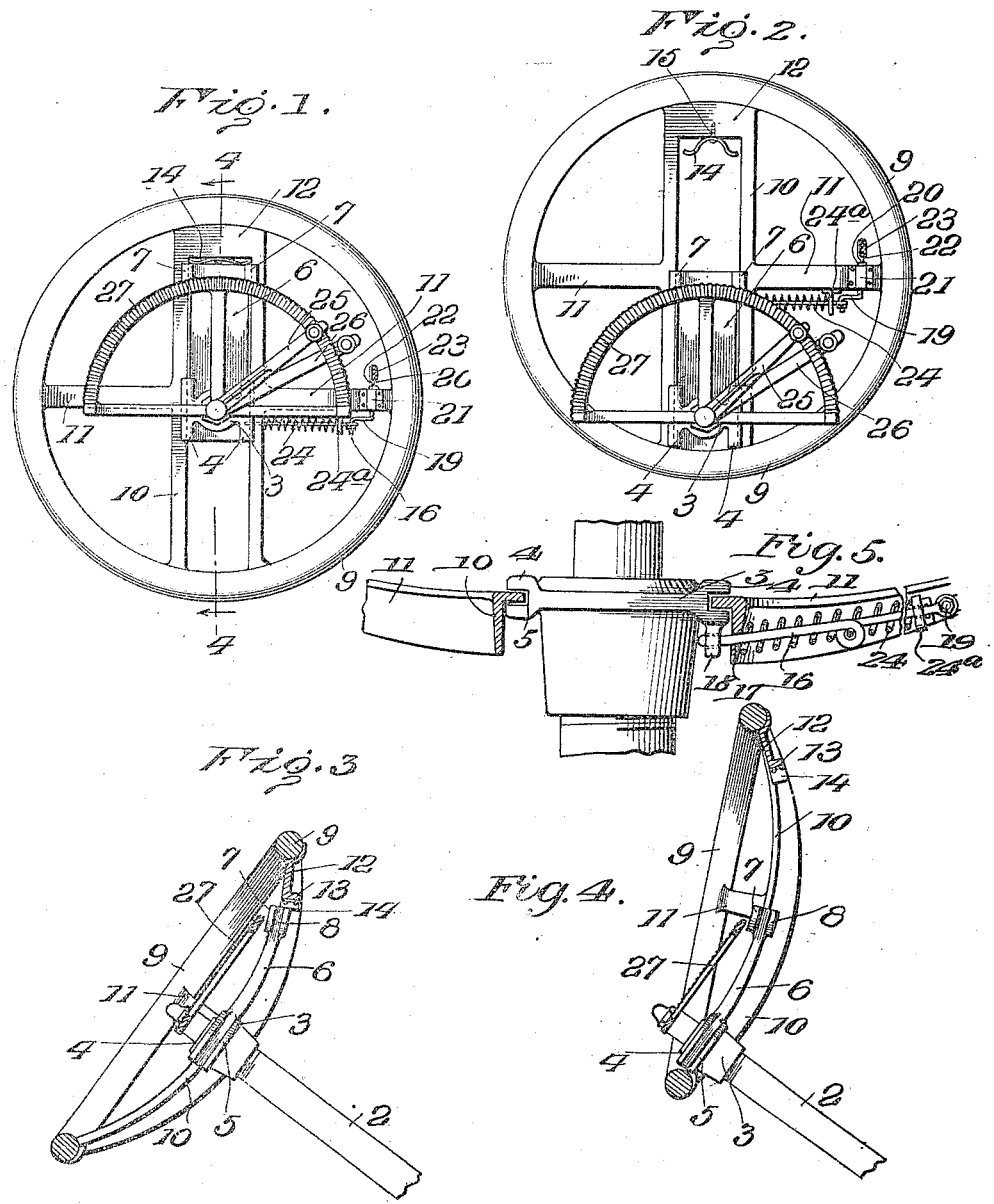
Witnesses
Jno Finire
W. A. Williams.
Inventor
A. G. Neville.
By
Attorneys.

UNITED STATES PATENT OFFICE.

ASA G. NEVILLE, OF WELLSBURG, WEST VIRGINIA.

STEERING-WHEEL FOR AUTOMOBILES.

1,168,958.  Specification of Letters Patent.  Patented Jan. 18, 1916.

Application filed December 31, 1913. Serial No. 809,749.

*To all whom it may concern:*

Be it known that I, ASA G. NEVILLE, citizen of the United States, residing at Wellsburg, in the county of Brooke and State of West Virginia, have invented certain new and useful Improvements in Steering-Wheels for Automobiles, of which the following is a specification.

My invention relates to automobiles, flying machines, motor-boats and like vehicles, and particularly to the steering posts and the steering wheels thereof.

In the ordinary arrangement for steering wheels, the wheel is fixed upon the steering post or shaft to turn therewith and is held at all times concentric thereto. This position of the wheel impedes very greatly the movement of the driver into and out of the driver's seat.

It is the main object of my invention to obviate this inconvenience by so mounting the wheel on the post that while the wheel has at all times rotative engagement with the post, it has also a sliding engagement therewith so that the wheel may be shifted into a position eccentric with the post and therefore shifted away from the driver's seat, thus increasing the space between the seat and the wheel and thus permitting the driver to have easier access to the seat.

A further object of the invention is to so construct the connection between the wheel and post that the usual spark and throttle controlling levers together with the rack therefor may be used.

A further object of the invention is to so construct the coacting parts of the wheel and post that a thoroughly strong rotative engagement is effected between the wheel and the post, and to so form the wheel and the head of the post that they may be readily and cheaply manufactured.

Still another object of the invention is the provision of latching means whereby the wheel may be firmly engaged with the post, this latching means being so disposed that it may be readily operated when the operator's hand is on the rim of the wheel, and also being so disposed that no strain will come upon the latch.

A still further object is to provide means acting to cushion the jar or shock of the wheel when it is released after being shifted to a position of eccentricity and returns to its position of concentricity.

Other objects will appear in the course of the following description.

My invention is illustrated in the accompanying drawings wherein:

Figure 1 is a face view of the wheel lowered into concentricity with the steering shaft. Fig. 2 is a like view to Fig. 1 but showing the wheel raised. Fig. 3 is a section on the line 4—4 of Fig. 1 showing the wheel lowered. Fig. 4 is a like section to Fig. 3 but showing the wheel raised. Fig. 5 is a fragmentary enlarged transverse section through the wheel and showing the means for latching the wheel in a position concentric to the shaft.

Corresponding and like parts are referred to in the following description and indicated in all the views of the accompanying drawings by the same reference characters.

Referring to these figures, 2 designates the steering post of an automobile or other type of motor driven vehicle provided with a hand controlled steering mechanism. This steering post is provided at its upper end with a head 3 having integrally formed therewith parallel longitudinally extending ribs 4 which are longitudinally grooved as at 5 for engagement with guides as will be later stated. The ribs 4 are formed integral with the head 3 and extending forward from the head 3 adjacent its upper face is an integral web 6, the forward end of which is provided on each side with the thickened portions or ribs 7 which are longitudinally grooved at 8, the grooves 8 being in alinement with the grooves 5.

The steering wheel comprises a rim 9 of any ordinary or suitable construction and the transversely extending guides 10 which are angular in cross section as illustrated in Fig. 5. Formed integral with these guides 10 are the arms 11 which are preferably T-shaped in cross section. These arms 11 and the guides 10 together form a spider and are preferably formed integral with the wheel rim and with each other, though I do not wish to be limited to this. At one end the guides 10 are connected by a transverse web 12 with a downwardly depending rib 13 which crosses and forms the end of the space between the guides 10.

The head 3 is disposed between the guides 10 and the horizontal flanges of the angular guides 10 extend into the grooves 5 and 8 as illustrated in Fig. 5. The guides 10 are downwardly and centrally curved, as are the arms 11 and as a consequence of these guides being slightly curved or concaved, the web 6 is slightly curved. A cushioning and anti-rattling spring is disposed across the end of the guideway formed by the guides 10, and as illustrated this cushioning spring is a slightly bowed leaf spring 14 attached at its middle as at 15 to the inner face of the downwardly depending flange 13. When the wheel is disposed concentrically to the post 2, the end of the extension 6 abuts against and presses inward on this spring 14.

For the purpose of automatically locking the wheel in a position concentric to the steering post, I provide a spring actuated latching device which is suitably mounted upon the wheel and which passes through an opening in one of the guides 10 and into a locking recess formed in the sliding head. This latching device is provided with means disposed adjacent the rim of the wheel whereby the finger of the operator may be used to unlatch the wheel, thus permitting the wheel to drop down into a position of eccentricity to the post.

As illustrated, the latching device comprises a latching rod or bolt 16 whose inner end passes through a perforation 17 formed in one of the guides 10 and which is adapted to engage in a perforation 18 formed in the head. The outer end of this bolt 16 is connected to a crank arm 19 formed upon a small crank rod 20 which is mounted in a suitable bearing 21 formed upon one of the spider arms 11, this crank rod 20 being formed with a crank arm 22 having a thumb piece 23 whereby it may be operated. A spring 24 surrounds the bolt 16 and has its coils operatively connected thereto. This spring bears against the face of a bracket 24ª and acts to force the bolt inward in position to engage the head on the steering shaft.

Mounted upon the upper end of the steering shaft in any suitable manner are the usual levers 25 and 26, one controlling the spark and the other controlling the throttle. These levers connect to independent shafts which pass down through the center of the tubular steering post. The levers operate over an arcuate rack 27 as is usual in this class of devices. Inasmuch as these levers and their respective connections to the throttle and spark mechanism form no part of my present invention, it has not been thought necessary to illustrate these connections.

The operation of my invention will be obvious from what has gone before. Under normal conditions the wheel is disposed concentrically to the steering post and locked in this position by means of the latch. When the driver, however, desires to enter the vehicle or get out of the driver's seat, it is only necessary to release the latch by pressing upon the thumb piece 23 whereupon the wheel may be shifted upward and outward, assuming that the steering shaft or post is inclined as is usual in automobiles, thus increasing the distance between the wheel and the driver's seat and thus permitting ready ingress to or egress from the seat. As soon as the driver has left the seat or entered it and releases the wheel, gravity will act to carry the wheel back to its concentric position and the spring 14 will cushion the wheel against the jar incident to this return to concentricity. At the same moment the latch will spring into the recess 18 and lock the wheel when the wheel is exactly concentric.

It will be seen that by my construction I provide a large bearing surface between the wheel and the head of the steering shaft and that the leverage of the wheel upon the steering shaft is increased by the extension 6 of the head of the shaft. Furthermore it will be seen that by my construction I leave the center of the wheel entirely open and the passage through the shaft entirely unimpeded and am thus permitted to use with my construction the throttle and spark controlling shafts together with the levers therefor. It will further be seen that by forming the guides 10 slightly bowed, the lower margin of the rim of the wheel, when the wheel is shifted upward, will move not only upward but inward thus gaining still more space between the seat and the lower margin of the wheel. In other words, the wheel moves in the arc of a circle. Again, by placing the thumb piece 23 adjacent the rim of the wheel, the necessity for the operator removing his hand from the rim of the wheel in order to shift the wheel is removed. It will be seen that there are no loose joints in my device which are liable to rattle as there are in those constructions where the wheel is pivoted upon the upper end of the steering post. The guides 10 are securely braced by the transversely extending spider arms 11 and therefore there is no necessity of constantly adjusting or tightening the engaging parts of the wheel and shaft head. It will also be noticed that the extension of the head forms a stop limiting the downward movement of the wheel under the action of gravity so that the wheel will be stopped at the point where the wheel is exactly concentric to the head and shaft. The cushioning spring will also act under these circumstances to prevent any rattling of the parts, this spring when the parts are in the position shown in Fig. 1, urging the steering wheel upward with relation to the steering post and taking up any lost motion between the latching bolt and the head 3.

While I have illustrated what I believe to be the best form of my invention, I do not wish to be limited thereto as it is obvious that many changes might be made therein without departing from the spirit thereof.

What I claim is:

1. The combination with an upwardly inclined shaft having a head thereon, of a steering wheel having spaced parallel guides between which the head is received and with which the head has sliding engagement, the space between said guides being unobstructed, of means for locking the wheel in a lowered position concentric to the shaft, and an upward extension carried by said head and forming a stop limiting the downward movement of the wheel under the action of gravity to a position where the wheel is concentric to the shaft, said extension having sliding engagement with the guides.

2. The combination with a shaft having a rectangular head thereon provided at its outside edges with guide grooves and having a web extending therefrom on one side, said web on its extremity being formed with guide grooves, of a steering wheel having spaced parallel guides between which the head is received, the space between said guides being entirely unobstructed, said guides engaging said guide grooves in the head and web, the extension on the head limiting the downward movement of the wheel with relation to the head to a position where the wheel is concentric to the head, and latching means for detachably holding the wheel concentric to the head.

In testimony whereof I affix my signature in presence of two witnesses.

ASA G. NEVILLE. [L. S.]

Witnesses:
W. J. HINDMAN,
C. B. MAGEE.